Jan. 11, 1955  D. McCOLLUM  2,698,999
BORDER MARKING GAUGE
Filed March 19, 1952
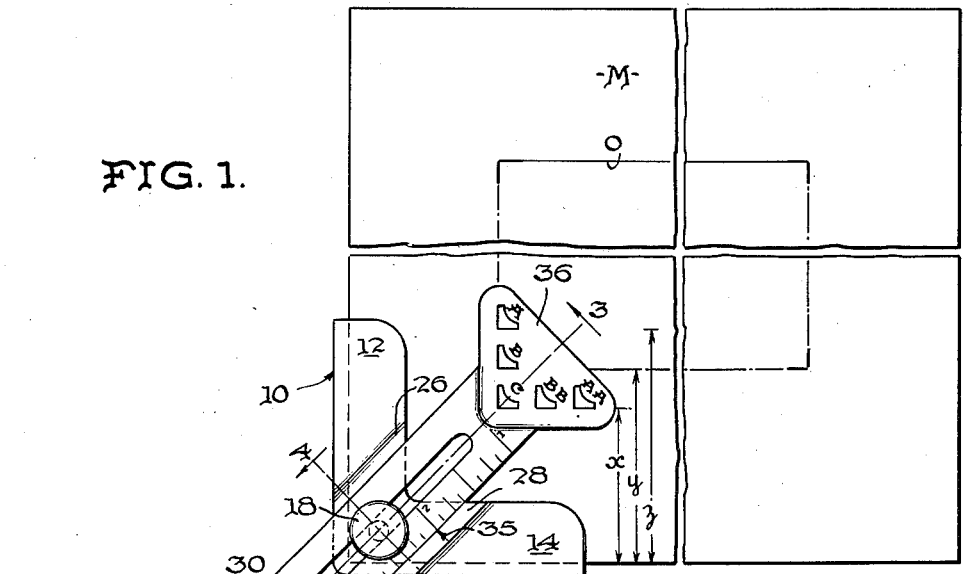
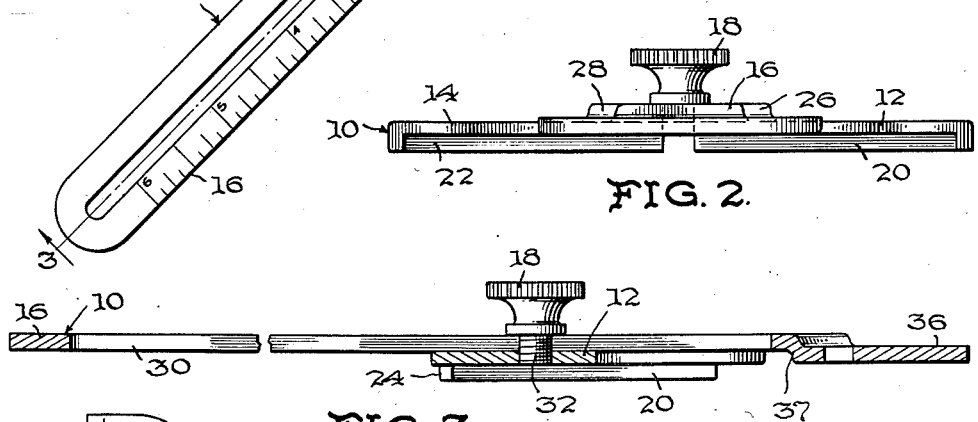
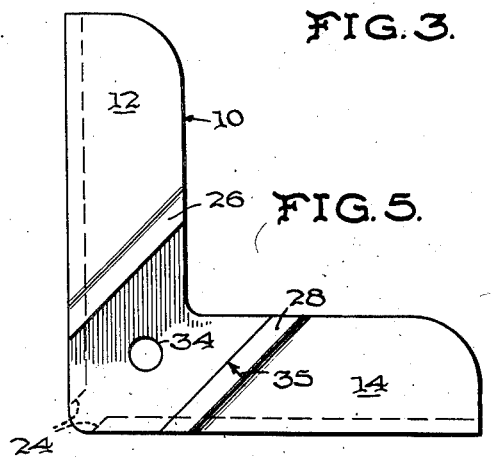
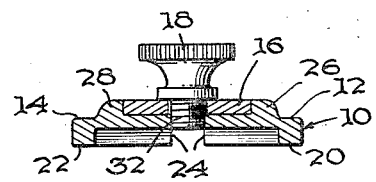
INVENTOR.
DEAN McCOLLUM
BY Raymond N. Matson
AGENT

United States Patent Office 2,698,999
Patented Jan. 11, 1955

2,698,999

BORDER MARKING GAUGE

Dean McCollum, Little Rock, Ark.

Application March 19, 1952, Serial No. 277,354

4 Claims. (Cl. 33—95)

This invention relates generally to gages and more particularly to a gage for use in laying off and marking borders on mats, posters, etc.

Gages of this general type are known in the art and, as a rule, are characterized by certain inherent disadvantages making them undesirable for use. Among these disadvantageous features are an unnecessary bulkiness rendering the gage unhandy in use, a poor design limiting the gage to use for marking equal borders or requiring attachments and additional operations for marking borders of unequal width, and an impractical structure rendering the gage difficult to manufacture and hence unnecessarily high in cost.

Accordingly, the chief object of the present invention is to provide an improved border marking gage which will obviate the above mentioned disadvantages characterizing prior art structures.

Another important object of the present invention is to provide an improved border marking gage which may be set in a single position of adjustment for the marking of borders of unequal widths.

A further important object of the invention is to provide an improved border marking gage which is compact in form, has a wide range of adjustment, and is extremely accurate in use.

A still further important object is to provide an improved border marking gage which may be readily and economically manufactured and which will be rugged and of long life and easy to use.

Other objects and advantages of the invention will become apparent during the course of the following description.

In the drawings I have shown one embodiment of the invention. In this showing:

Figure 1 is a top plan view of the device comprising the present invention in operative position on a mat for the marking of borders thereon;

Figure 2 is an elevational view to an enlarged scale of the gage looking from the line marking end;

Figure 3 is a central, vertical, longitudinal sectional view of the gage taken on the line 3—3 of Figure 1;

Figure 4 is a transverse vertical sectional view of the gage taken on the line 4—4 of Figure 1; and Figure 5 is a top plan view to an enlarged scale of the base of the gage with the sliding scale removed.

Referring to the drawings, numeral 10 designates the gage as a whole which comprises an angle shaped base having legs 12 and 14, a sliding scale 16, and a thumb nut 18 for clamping the scale to the base in any desired position of adjustment.

The legs 12 and 14 of the base are provided with flanges 20 and 22 respectively depending from their outer edges which are adapted to engage the sides of a mat, etc., to be laid off. The flanges terminate short of their normal point of intersection to form a corner opening 24 which prevents damage to the corner of the mat, etc., during the positioning of the scale thereon.

The scale 16 is slidable on the base at an angle of 45 degrees with respect to its legs and is closely guided in its sliding movement by diagonally extending shoulders 26 and 28 formed respectively on the legs 12 and 14. A slot 30 is formed centrally of the scale 16 throughout most of its length for the reception of a screw 32 extending from the thumb nut 18 and into a threaded aperture 34 formed in the base of the gage 10 on the line extending at 45 degrees from its lower left hand corner.

Scale markings are provided on the scale 16 between the slot 30 and one edge and a reference arrow or line 35 on the shoulder 28. The scale may thus be clamped in any desired single position of adjustment to the base and borders of different widths laid off on mats, etc., without changing the adjusted position as will be described.

The inner end 36 of the scale 16 is downwardly offset as at 37 to align it with the base of the gage and is provided with a plurality of slots or apertures which include sets of intersecting guide or marking edges A, B, C, BB and AA which are especially formed to perform dual functions. Each set includes a marking edge parallel to the outer edge of the legs 12 and 14 and hence to each other and to the sides of the mat, etc., over which the gage is placed. Moreover, as seen in Figure 1, the distance $x$ or the distance from the horizontal edge of the aperture C to the edge of the mat M is always equal to the distance set on the scale at the reference line 35. This is likewise true of the distance between the vertical marking edge of the slot C to the left edge of the mat.

It will be readily apparent that the distance $y$ and $z$ can be respectively greater than $x$ and $y$ by any desired amount. As shown for purposes of illustration, this amount is ½ of an inch and the device is adjusted for the marking of borders of from 2 to 3 inches in width.

In use, the gage is positioned over a mat (Figure 1) which has previously been trimmed to the glass size of a picture frame for which it is intended, it being understood that the bottom mat border in such use is generally ½ of an inch wider than the remaining borders.

If the mat is to have 2 inch borders with the bottom border being 2½ inches, the 2 inch mark of the scale 16 is set adjacent the reference line 35. An L-shaped line drawn along the intersecting marking edges of slot B will thus mark a 2 inch left hand border and a 2½ inch bottom border at the left hand lower corner of the mat M. The gage is now positioned over the right hand bottom corner and an L-shaped mark along the edges of slot BB will mark a 2 inch right hand border and complete the marking of the 2½ inch bottom border. The gage is now positioned over each top corner of the mat and an L-shaped mark is made in slot C each time to mark a 2 inch top border and complete the marking of the 2 inch side borders. The mat is thus completely marked and ready to have the central picture opening O cut therein leaving the described borders in the mat.

By way of further example, the scale 16 is set at 4 inches to mark a 4 inch border and 5 inch bottom border on a mat. The gage is placed on the lower left corner of the mat and an L-shaped mark made in the slot A. After moving the gage to the right hand lower corner, an L-shaped mark is made in slot AA. Finally, the top corners are marked through the slot C and the opening in the mat is ready to be cut.

It will be readily apparent that if a poster or sign is to be marked off with equal borders, that the required distance is set on the scale 16 and only slot C is used at each of the four corners.

The gage comprising the present invention is thus a very versatile, simple and compact tool for marking mats for cutting out openings, for locating French lines and for measuring different distances from the edge of a mat, poster, card, etc., for a single setting of the scale.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:

1. In a border marking gage adapted to be positioned against a corner formed by two sides of the material to be marked and including a sliding scale, a marking head fixed to the end of the scale, and an L-shaped series of spaced slots formed in said head to indicate borders of a width predetermined by the setting of said scale and variable by the spacing of said slots.

2. A device as recited in claim 1 wherein said slots are L-shaped and include edges parallel to the sides of the material.

3. A device as recited in claim 1 wherein the slots in one side of said L-shaped series bear complementary indicia to the slots in the other side thereof to indicate the predetermined width selected at any adjacent corner.

4. A device as recited in claim 3 wherein said slots are L-shaped and include edges parallel to the sides of the material.

References Cited in the file of this patent

UNITED STATES PATENTS

| Number | Name | Date |
|---|---|---|
| 456,105 | Adams | July 14, 1891 |
| 720,824 | Lieber | Feb. 17, 1903 |
| 1,337,823 | Crane | Apr. 20, 1920 |